(12) United States Patent
Mundada et al.

(10) Patent No.: US 9,983,981 B1
(45) Date of Patent: May 29, 2018

(54) SYSTEM, METHOD, AND COMPUTER PROGRAM FOR IMPLEMENTING OPTIMAL REGRESSION TEST STRATEGIES

(71) Applicant: Amdocs Development Limited, Limassol (CY)

(72) Inventors: Pravin Mohanlal Mundada, Pune (IN); Kanya Gupta, Pune (IN); Arindam Chakraborty, Pune (IN); Sanjay Bhatia, Pune (IN); Vikram Pandey, Pune (IN)

(73) Assignee: Amdocs Development Limited, Limassol (CY)

( * ) Notice: Subject to any disclaimer, the term of this patent is extended or adjusted under 35 U.S.C. 154(b) by 89 days.

(21) Appl. No.: 15/191,407

(22) Filed: Jun. 23, 2016

Related U.S. Application Data

(60) Provisional application No. 62/183,655, filed on Jun. 23, 2015.

(51) Int. Cl.
  *G06F 9/44* (2018.01)
  *G06F 11/36* (2006.01)
(52) U.S. Cl.
  CPC ................. *G06F 11/3676* (2013.01)
(58) Field of Classification Search
  CPC .................................................. G06F 11/3676
  USPC ......................................................... 717/124
  See application file for complete search history.

(56) References Cited

U.S. PATENT DOCUMENTS

| | | | |
|---|---|---|---|
| 5,673,387 A | 9/1997 | Chen et al. | |
| 7,299,452 B1* | 11/2007 | Zhang | G06F 17/2223 704/8 |
| 7,779,303 B2 | 8/2010 | Stubbs et al. | |
| 8,806,450 B1* | 8/2014 | Maharana | G06F 11/3688 717/133 |
| 9,514,037 B1* | 12/2016 | Dow | G06Q 10/06315 |
| 2003/0028856 A1* | 2/2003 | Apuzzo | G06F 11/3684 717/124 |
| 2003/0084429 A1* | 5/2003 | Schaefer | G06F 11/3664 717/125 |
| 2005/0065754 A1* | 3/2005 | Schaf | G06Q 10/0635 702/188 |

(Continued)

OTHER PUBLICATIONS

U.S. Appl. No. 13/722,997, filed Dec. 20, 2012.

*Primary Examiner* — Chameli Das
(74) *Attorney, Agent, or Firm* — Zilka-Kotab, PC

(57) ABSTRACT

A system, method, and computer program product are provided for implementing optimal regression test strategies. In use, one or more functional testing entities are identified to be utilized to determine a scope associated with at least one regression test to be performed. The at least one regression test to be performed is associated with at least one change made to a functional system based on multi-dimensional modelling. Additionally, source code is mapped to the one or more functional testing entities, the source code being associated with the functional system. Further, a multi-dimensional impact score is calculated for each of the one or more functional testing entities resulting from the at least one change made to the functional system, based on the mapping of the source code to the one or more functional testing entities. Moreover, an output is generated showing impacted functional testing entities based on the multi-dimensional impact score for each of the one or more functional testing entities.

11 Claims, 10 Drawing Sheets

(56) References Cited

U.S. PATENT DOCUMENTS

| | | | |
|---|---|---|---|
| 2005/0203717 A1* | 9/2005 | Parimi | G06F 11/263 702/188 |
| 2008/0040706 A1* | 2/2008 | Blancha | G01R 31/2834 717/124 |
| 2008/0126867 A1 | 5/2008 | Pandarinathan et al. | |
| 2008/0313596 A1* | 12/2008 | Kreamer | G06F 8/20 717/101 |
| 2011/0145793 A1 | 6/2011 | Alexander et al. | |
| 2011/0283260 A1* | 11/2011 | Bucuvalas | G06F 11/3664 717/124 |
| 2013/0111267 A1 | 5/2013 | Beryoza et al. | |
| 2016/0085663 A1* | 3/2016 | Best | G06F 11/3684 714/38.1 |

\* cited by examiner

400

| | Solution Book | KPIs |
|---|---|---|
| | | Business KPIs |
| Create Contact | Manage New Residential Customer Interaction via Call Center – for Bundle – via Call Center/Shop | COP |
| Resend Bill | Customer has a Postpaid Promoting Information Request and Complaint – via Shop / Call Center | CHQ – Billing and Account Data |
| Search / View Unbilled Charge | Customer has a Postpaid Billing Information Request and Complaint – via Shop / Call Center | CHQ – Billing and Account Data |
| Update Customer Details | Residential Customer has a Customer Profile Request – via Shop/Call Center | CHQ – Billing and Account Data |

Create Contact for New Residential Customer Interaction – for Bundle – via Call Center/Shop Resend Bill – Postpaid Billing Information – via Shop / Call Center Search / View Unbilled Charge – via Shop / Call Center Update Customer Details – Billing and Account Data – Postpaid – via Shop / Call Center

FIGURE 4

| Source File | Related FTE |
|---|---|
| Abc.cpp | F1 |
| xyz.java | E2 |
| 123.java | E2 |

| Regression TR/TC | Related FTE |
|---|---|
| TR#1/TC#1 | E1 |
| TRn/TCn | E2 |
| TRm/TCm | E2 |

FIGURE 7

SYSTEM, METHOD, AND COMPUTER PROGRAM FOR IMPLEMENTING OPTIMAL REGRESSION TEST STRATEGIES

CLAIM OF PRIORITY

This application claims the benefit of U.S. Provisional Application No. 62/183,655, filed Jun. 23, 2015, the entire contents of which are incorporated herein by reference.

FIELD OF THE INVENTION

The present invention relates to software testing projects, and more particularly to regression testing software.

BACKGROUND

The testing of software is a critical step in the software development lifecycle. The objective of the testing is to verify and validate the integration of the software, the hardware and the configuration thereof, and to prevent malfunction of the software when in use.

Regression testing is a testing process utilized to identify new errors, or regressions, in existing functionality after changes have been made to code or configurations associated with software. This is to ensure that the changes in the system/software have not caused any new defects in an already working version.

In large complex software development projects, changes will be introduced in many aspects of the software architecture, such as code changes, configuration changes, applicative changes, operational changes, or other types of changes. These continual changes need to be tested along with regression testing on an on-going basis to ensure software integrity and functionality. Each change therefore is effort in the entire value chain of software delivery.

Full coverage regression is an overhead and needs to be optimized for both time and effort. Software testing practitioners are always looking for effective techniques to manage, optimize, and identify means which have efficient throughput and turnaround for the right regression coverage and prioritization.

Many new industry practices have been adopted to have the right measure/size of a test suite that provides a high degree of change coverage (i.e., a test suite that tests most or all of the code or other changes). Most such practices do not cover an end to end view of the change in hand. Such practices typically focus on the code change or the functionality that has been introduced. Change based optimized regression testing needs to take into consideration different dimensions of change, such as changes in the code, changes in the configurations (e.g. controlling behaviors such as operational behaviors, applicative/functional behaviors, etc.), the interface and the knowledge/experience of the person making the changes, and defect history, etc.

There is thus a need for addressing these and/or other issues associated with the prior art.

SUMMARY

A system, method, and computer program product are provided for implementing optimal regression test strategies. In use, one or more functional testing entities are identified to be utilized to determine a scope associated with at least one regression test to be performed. The at least one regression test to be performed is associated with at least one change made to a functional system based on multi-dimensional modelling. Additionally, source code is mapped to the one or more functional testing entities, the source code being associated with the functional system. Further, a multi-dimensional impact score is calculated for each of the one or more functional testing entities resulting from the at least one change made to the functional system, based on the mapping of the source code to the one or more functional testing entities. Moreover, an output is generated showing impacted functional testing entities based on the multi-dimensional impact score for each of the one or more functional testing entities.

BRIEF DESCRIPTION OF THE DRAWINGS

FIG. 4 illustrates a solution book example, in accordance with one embodiment.

FIG. 6 illustrates a table showing a sample mapping process, in accordance with one embodiment.

FIG. 7 illustrates a table showing a mapping between a functional testing entity and related test rules and test cases in a regression calendar repository, in accordance with one embodiment.

DETAILED DESCRIPTION

Figure 1:
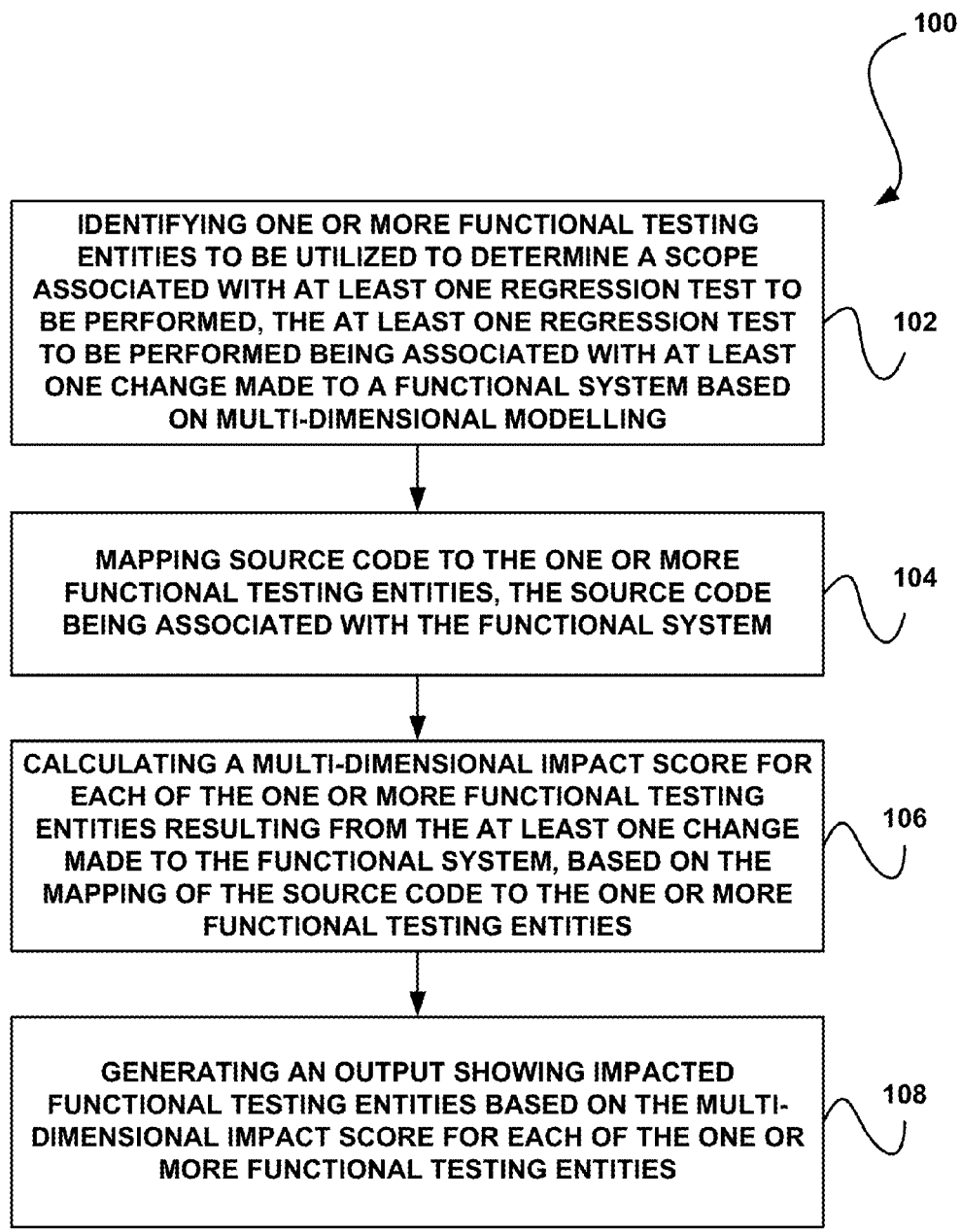
FIG. 1 illustrates a method for implementing optimal regression test strategies, in accordance with one embodiment.

FIG. 1 illustrates a method 100 for implementing optimal regression test strategies, in accordance with one embodiment.

As shown, one or more functional testing entities are identified to be utilized to determine a scope associated with at least one regression test to be performed. See operation 102. The at least one regression test to be performed is associated with at least one change made to a functional system based on multi-dimensional modelling. The functional system may include any type of software, hardware, and/or computer code, etc.

Regression testing is a testing process utilized to identify new errors, or regressions, in existing functionality after changes have been made to code or configurations associated with software. This is to ensure that the changes in the system/software have not caused any new defects in an already working version.

Changes may be introduced in many aspects of the software architecture, such as code changes, configuration changes, applicative changes, operational changes, or other types of changes. These continual changes need to be tested along with regression testing on an on-going basis to ensure software integrity and functionality.

A functional testing entity refers to any defined unique combination of business flows (e.g. potentially nested to subcomponents called sub-business flows, etc.), and system capabilities. Functional testing entities are created to have more granular and deep functional scenario test coverage. Thus, a functional testing entity may be associated with various scenarios, business processes, and parameters, etc.

In one embodiment, a user may create and/or define the functional testing entities. In the context of the present description, the term "solution book" may refer to a repository of functional testing entities. In one embodiment, the solution book will also provide related business key performance indicators (KPIs) that are mapped to the respective functional testing entities.

With further reference to FIG. 1, source code is mapped to the one or more functional testing entities. See operation 104. The source code is associated with the functional system. The source code may include any type of code, files, and or processes associated with the functional testing entities. Additionally, the source code may be associated with a date range (e.g. corresponding to a date range when changes were made to the source code and/or functional system, etc.). The mapping of source code to the functional testing entities may also function to allow identification of related code impacts during development.

Further, a multi-dimensional impact score is calculated for each of the one or more functional testing entities resulting from the at least one change made to the functional system, based on the mapping of the source code to the one or more functional testing entities. See operation 106.

The impact score may be calculated utilizing a variety of criteria. For example, the impact score may be calculated based on a size of a source code change associated with a corresponding functional testing entity. As another example, the impact score may be calculated based on a purpose of a source code change associated with a corresponding functional testing entity.

As another example, the impact score may be calculated based on code metrics of source code associated with a corresponding functional testing entity. As yet another example, the impact score may be calculated based on a number of times a file of source code associated with a corresponding functional testing entity is changed. As another example, the impact score may be calculated based on a defect history of source code associated with a corresponding functional testing entity.

As another example, the impact score may be calculated based on configuration changes of non-source code related data (e.g. reference data, etc.) associated with a corresponding functional testing entity. As another example, the impact score may be calculated based on criticality of business functionality associated with a corresponding functional testing entity. As another example, the impact score may be calculated based on a knowledge level or experience of a programmer associated with a corresponding source code change. Of course, this criteria is only an example of the criteria that may be utilized to determine the impact score. In various embodiments, different criteria and/or any combination of the aforementioned criteria may be utilized to determine the impact score.

Furthermore, the impact score may include any number and/or indicator capable of indicating an impact of a functional testing entity (or associated source code) on regression testing. In one embodiment, calculating the impact score for each of the functional testing entities may include calculating a change request impact score and a problem request impact score for each of the one or more functional testing entities.

With further reference to FIG. 1, an output is generated, and may be displayed, showing impacted functional testing entities based on the multi-dimensional impact score for each of the one or more functional testing entities. See operation 108. The output may include a variety of outputs, such as graphs, impact scores, key performance indicators, and/or prioritization of functional testing entities, etc.

For example, in one embodiment, generating the output showing the impacted functional testing entities may include generating at least one graph or scorecard showing the impacted functional testing entities based on changes to associated source code. In this case, the graph may include an application level graph and/or a version level graph. Furthermore, the graph may show a prioritized list of functional testing entities and impacted business key performance indicators.

Additionally, the output may be configured to present a user with information to accurately decide the scope associated with the at least one regression test and regression testing priorities. As another option, the output may be configured to allow a user to identify associated test cases and test rules that constitute an optimal regression test calendar. The output may also be capable of being utilized as an accurate effort estimation for regression testing efforts based on the functional impacts of code changes.

The method 100 may be implemented by a system to provide a structured, systematic prediction framework for optimizing regression test strategy and key performance indicator (KPI) driven decision making based on multi-dimensional impact analysis. This method 100 may be implemented to help testing managers to prioritize regression coverage decision making for the impacted functionality (e.g. entity, business process, sub-process, etc.) based on changes introduced to the software/system. Additionally, developers also benefit from the framework, as it helps to proactively identify the potential impact in associated modules.

It should be noted that the method 100 may be implemented utilizing various systems, hardware, software, applications, user interfaces, etc., as dictated by the implementer. More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
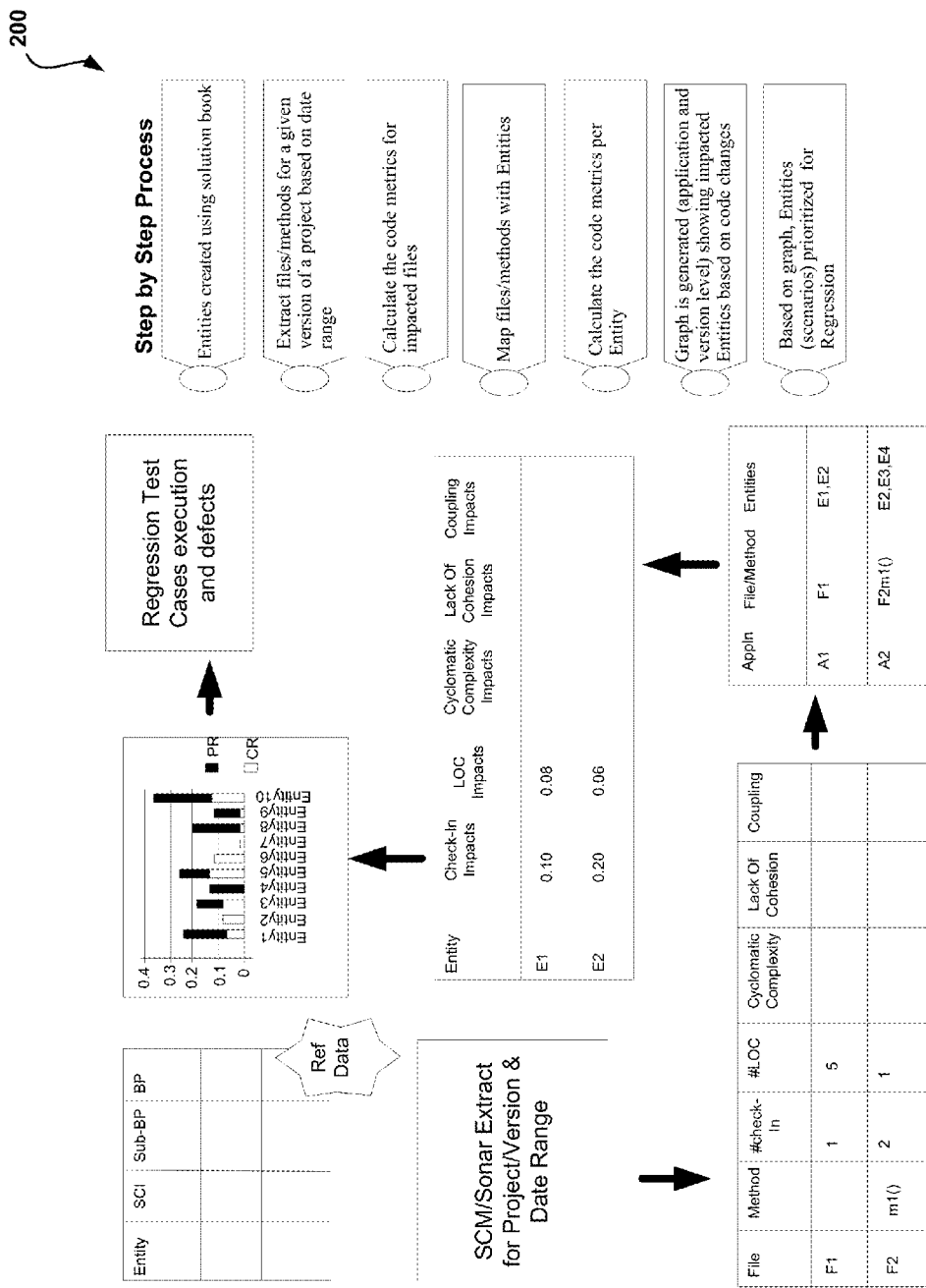
FIG. 2 illustrates a system flow for implementing optimal regression test strategies, in accordance with one embodiment.

FIG. 2 illustrates a system flow 200 for implementing optimal regression test strategies, in accordance with one embodiment. As an option, the system flow 200 may be implemented in the context of the details of FIG. 1. Of course, however, the system flow 200 may be implemented in the context of any desired environment. Further, the aforementioned definitions may equally apply to the description below.

Optimized Regression testing is an area of increasing significance and focus for software and testing practitioners. Change to the software may be caused because of code changes, configuration changes, and/or operational changes, etc. Changes introduced to a stable software system impacts the software/system in many ways. A full regression is not the desired path for every change, and it is imperative to have the ability to identify the impacted parts and provide a decision framework to test the software release for quality, performance, and compliance to desired functionality.

Existing systems do not take into account various dimensions that cause the change and such systems do not provide a comprehensive decision point to accurately predict regression scope and associated prioritization. The framework of FIG. 2 illustrates a novel approach to provide decision making for optimized regression testing scope determination.

In operation, functional testing entities may be created or identified using a solution book. A solution book refers repository of business processes and sub-business processes used to map against system capabilities. More information associated with the repository of business processes and sub-business processes capable of being used to map against system capabilities may be found in U.S. patent application Ser. No. 13/722,997, filed 12/20/2012, titled "SOFTWARE SOLUTION FRAMEWORK SYSTEM, METHOD, AND COMPUTER PROGRAM FOR ALLOWING INTERACTION WITH BUSINESS AND TECHNICAL ASPECTS OF A SOFTWARE APPLICATION", which is incorporated by reference herein in its entirety.

Files and/or methods may be extracted for a given version of a project based on a date range. Change request (CR) and problem request (PR) check-in counts may be created from the source code repository. Additionally, source code (e.g. files/methods) is mapped to functional testing entities.

Further, problem request and change request impacts (i.e. scores) are calculated per functional testing entity. Moreover, a graph is generated (application and version level) showing impacted entities based on code changes. Based on the graph, entities (e.g. scenarios) are prioritized for regression.

In one embodiment, a predictive analytics algorithm may be used to calculate problem request and change request impacts (i.e. scores) per functional testing entity.

The predictive analytics algorithm may take into consideration various parameters including, but not limited to: size of the code change or lines of code changed/added; purpose of code change (e.g. whether it is to add new system functionality or to fix defects, etc.); code metrics from evaluation of code (e.g. such as cyclomatic complexity, lack of cohesion of method metric, instability index [e.g. resulting from Afferent couplings, and Efferent couplings, etc.], etc.); the number of times a file is changed or the number of code check-ins to the SCM tool; a defect history derived from the source file (that has changed) can be used to predict the impact and side-effects; configuration changes of non-source related changes (e.g. such as reference data) can also be tracked to ascertain impacts; programmer experience as an indicator to control regression scope; and criticality of business functionality (of entities) to control regression scope (to be captured during the mapping entities and code/configurations), etc.

Based on this calculation (i.e. score) a graph may be generated (application and version level) showing an impact score on a functional testing entity and associated impacted business KPIs.

Figure 3:
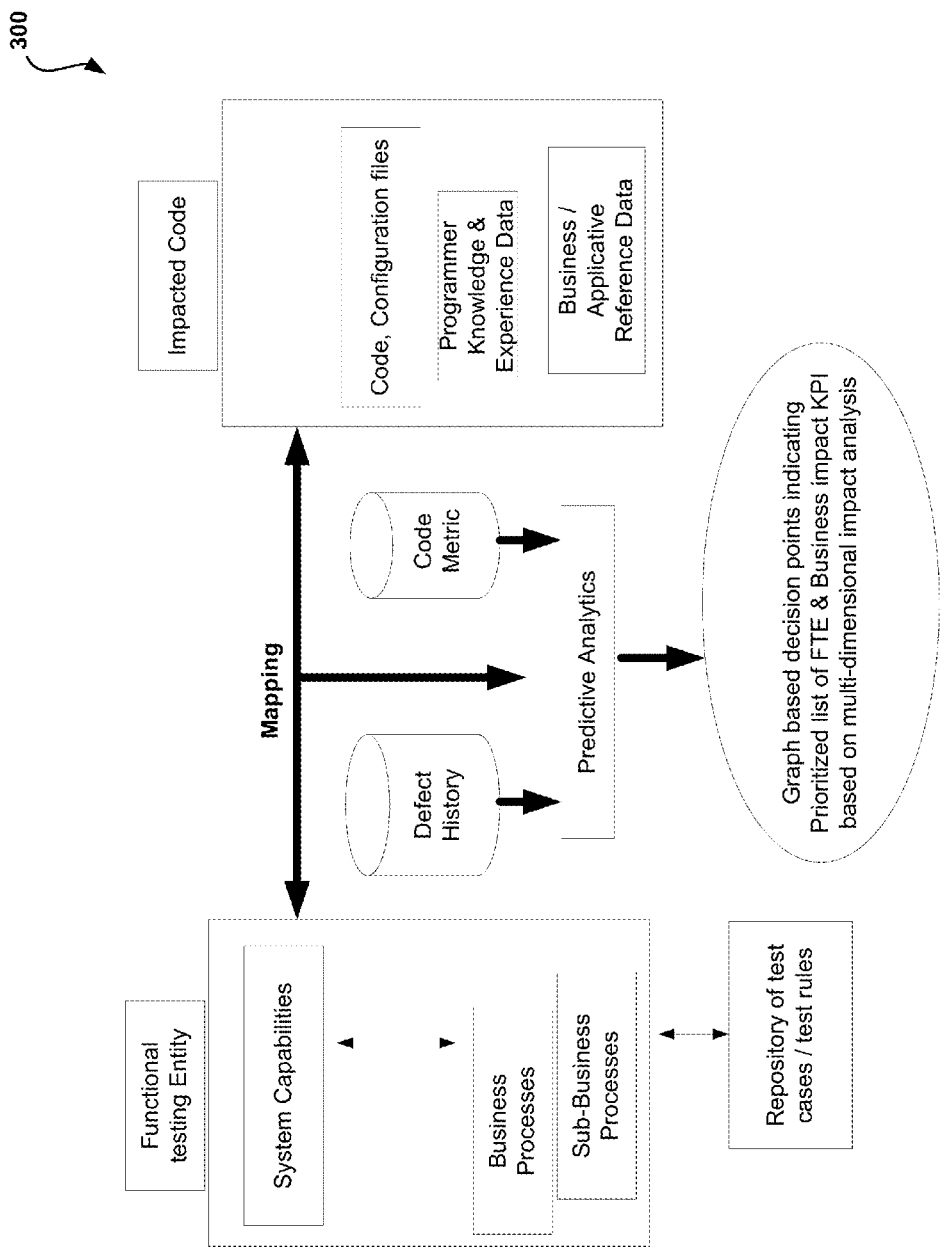
FIG. 3 illustrates a system framework for implementing optimal regression test strategies, in accordance with one embodiment.

FIG. 3 illustrates a system framework 300 for implementing optimal regression test strategies, in accordance with one embodiment. As an option, the system framework 300 may be implemented in the context of the details of the previous Figures. Of course, however, the system framework 300 may be implemented in the context of any desired environment. Further, the aforementioned definitions may equally apply to the description below.

One of the key functions of the system framework 300 is the generation of functional testing entities and the creation of mappings to code and regression calendars. In one embodiment, a functional testing entity repository may be created utilizing a solution book, which enlists a unique combination of business flows (nested to subcomponents called sub-business flows), and system capabilities. Functional testing entities may be created to have a more granular and deep functional scenario test coverage. The solution book may also provide related business KPIs which may also be mapped to the respective functional testing entities. Listing of KPIs against business processes provides additional data points during prediction analysis.

FIG. 4 illustrates a solution book example 400, in accordance with one embodiment. As an option, the example 400 may be viewed in the context of the details of the previous Figures. Of course, however, the example 400 may be viewed in the context of any desired environment. Further, the aforementioned definitions may equally apply to the description below.

FIG. 4 is a closer looks at potential reference data as shown in the context of FIG. 2.

Figure 5:
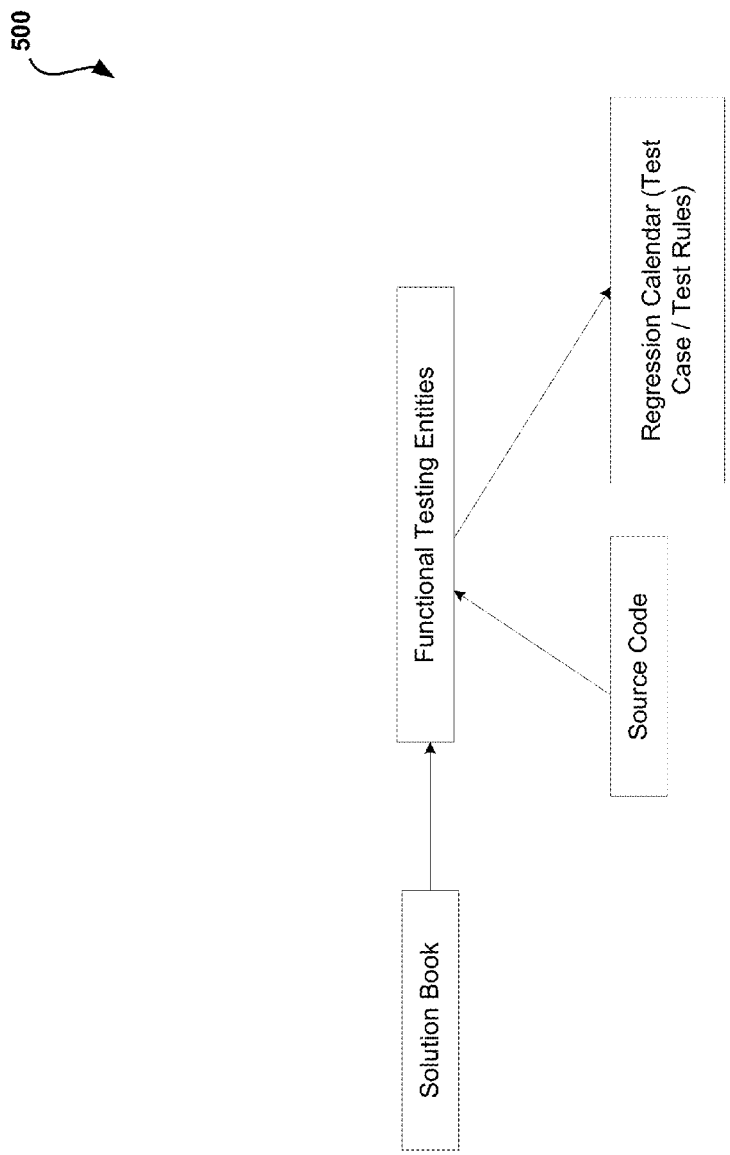
FIG. 5 illustrates a process for creating a mapping between functional testing entities, source code, and regression calendars, in accordance with one embodiment.

FIG. 5 illustrates a process 500 for creating a mapping between functional testing entities, source code, and regression calendars, in accordance with one embodiment. As an option, the process 500 may be implemented in the context of the details of the previous Figures. Of course, however, the process 500 may be implemented in the context of any desired environment. Further, the aforementioned definitions may equally apply to the description below.

In operation, for an on-going project, at the onset of a testing phase, as per change request or defect mapping of impacted code, functional testing entities and a regression calendar is setup.

For every change (e.g. enhancement such as a change request, or defect fix, etc.), a list of all the files / methods that are changed over a given date range (ongoing) are identified from a source code repository.

FIG. 6 illustrates a table 600 showing a sample mapping process, in accordance with one embodiment. As an option, the table 600 may be viewed in the context of the details of the previous Figures. Of course, however, the table 600 may be viewed in the context of any desired environment. Further, the aforementioned definitions may equally apply to the description below.

As shown in FIG. 6, mapping between impacted source files (code/configurations) and functional testing entities needs to be performed. Once done it becomes the reference data, persisted and available across different accounts and versions. The reference data may be updated as more entities are identified as impacted by code / configurations and may be persisted again (on an ongoing basis). Additional attributes such as knowledge / experience of the change contributor may also be captured during this process.

Similarly, a mapping is created between a functional testing entity and related test rules and test cases in the regression calendar repository. During the mapping the criticality of business functionalities of the functional testing entity is also documented in order to control the regression scope.

FIG. 7 illustrates a table 700 showing a mapping between a functional testing entity and related test rules and test cases in a regression calendar repository, in accordance with one embodiment. As an option, the table 700 may be viewed in the context of the details of the previous Figures. Of course, however, the table 700 may be viewed in the context of any desired environment. Further, the aforementioned definitions may equally apply to the description below.

Figure 8:
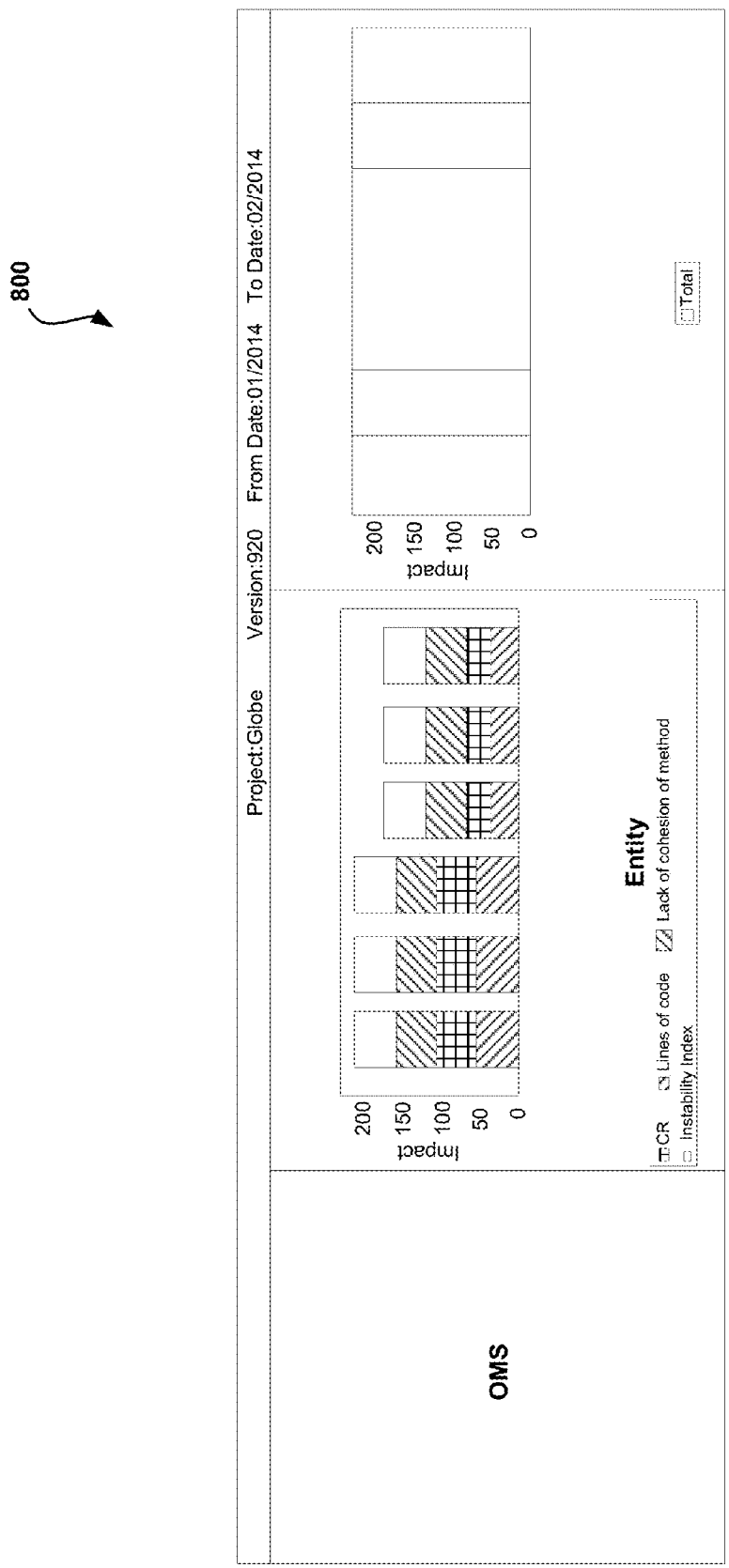
FIG. 8 illustrates a graph showing a prioritized list of functional testing entities and business impact key performance indicators (KPIs) based on multi-dimensional impact analysis, in accordance with one embodiment.

FIG. 8 illustrates a graph 800 showing a prioritized list of functional testing entities and business impact KPIs based on multi-dimensional impact analysis, in accordance with one embodiment. As an option, the graph 800 may be implemented in the context of the details of the previous Figures. Of course, however, the graph 800 may be implemented in the context of any desired environment. Further, the aforementioned definitions may equally apply to the description below.

The decision points allow the testing teams to accurately decide the scope of the regression testing and their prioritization, thus helping to identify associated test cases / test rules that constitute the optimal regression calendar.

The framework is not just restricted to the source code change but also takes into consideration configuration, operational, and reference data changes, defect history and knowledge level of the programmer, and produces the impact analysis using the same concept.

Another distinct advantage of such framework is for the developer community upstream during the development process. Mapping between entities, and code helps in identifying related code impacts during development. For example, in the data presented in FIG. 6, if xyzjava file is changed by the developer (for handling change requirements), the file 123.java will have potential impact and may require change since a common functional testing element is mapped to both the files.

Missed coding / design impacts can be addressed during handling of change requirements due to the mapping between entities, and related files. Where scoping and/or detailed designs may miss the impacts (only to be identified in later phases of system test / user acceptance test), the techniques/systems described herein provide a mechanism that builds a repository of potential related impacts.

Also, accurate effort estimation can be performed for the regression testing efforts based on the functional impacts of code change. This will be in proportion to the number of test cases impacted based on the impacted sub business processes The framework described herein presents distinct value propositions that helps in focused regression approach based on quantitate impact analysis and functional risk based testing white-box approach.

This the systems/techniques described herein also provide a holistic integrative approach to derive impacted regression scope and its prioritization. The systems/techniques described herein may also be utilized to build a repository for functionality testing entities using a solution book and further map it to code and a regression calendar. Code includes source code, configurations, and reference data. A solution book refers to a repository of business processes and sub-business processes used to map against system capabilities.

The systems/techniques described herein also provide predictive multi-dimensional impact analysis involving code metrics, defect history, impacted functional testing entities, criticality of impacted entities, etc. This list of parameters is extensible, and is configurable to support more dimensions of regression testing.

Also, in addition to identifying an optimal regression calendar, due to a mapping between code and entities, it is possible to identify related impacted code / configurations in related modules (e.g. which is useful during development phase to ensure that change requirements are not missed in any component). Further, the unique aspect of mapping entities to business KPIs helps in identifying which customer business flows are impacted due to introduced code / configuration changes.

The implementation of the systems/techniques described herein allow for faster and better quality regression testing, not only in system testing, but also across the subsequent phases of user acceptance testing (UAT) and production. The systems/techniques described herein may be implemented assuming that Business Process based testing is already implemented in the respective implementation projects and such system will be able to filter out the "required" regression test cases from an existing repository of test cases built on a Business Processes testing approach. While the systems/techniques described herein may use a solution book as a source of business processes to derive the unique modeling between impacted code / configurations and business processes, such systems/techniques may utilize other business processes from non-telecom domains as well.

This framework also will help establishing the impact on the system during scoping and requirement analysis phase by using the mapping between the functional entities and code. Similarly the mapping framework also helps programmers to ascertain the code impacts across the system based on the impacted entities (e.g. as shown in FIG. 6, etc.).

Figure 9:
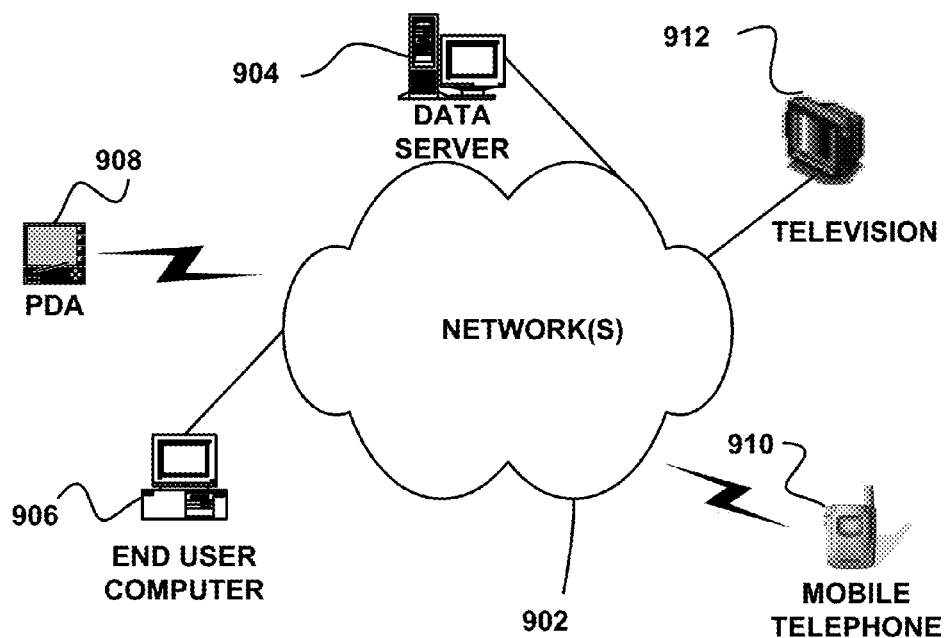
FIG. 9 illustrates a network architecture, in accordance with one possible embodiment.

FIG. 9 illustrates a network architecture 900, in accordance with one possible embodiment. As shown, at least one network 902 is provided. In the context of the present network architecture 900, the network 902 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 902 may be provided.

Coupled to the network 902 is a plurality of devices. For example, a server computer 904 and an end user computer 906 may be coupled to the network 902 for communication purposes. Such end user computer 906 may include a desktop computer, lap-top computer, and/or any other type of logic. Still yet, various other devices may be coupled to the network 902 including a personal digital assistant (PDA) device 908, a mobile phone device 910, a television 912, etc.

Figure 10:
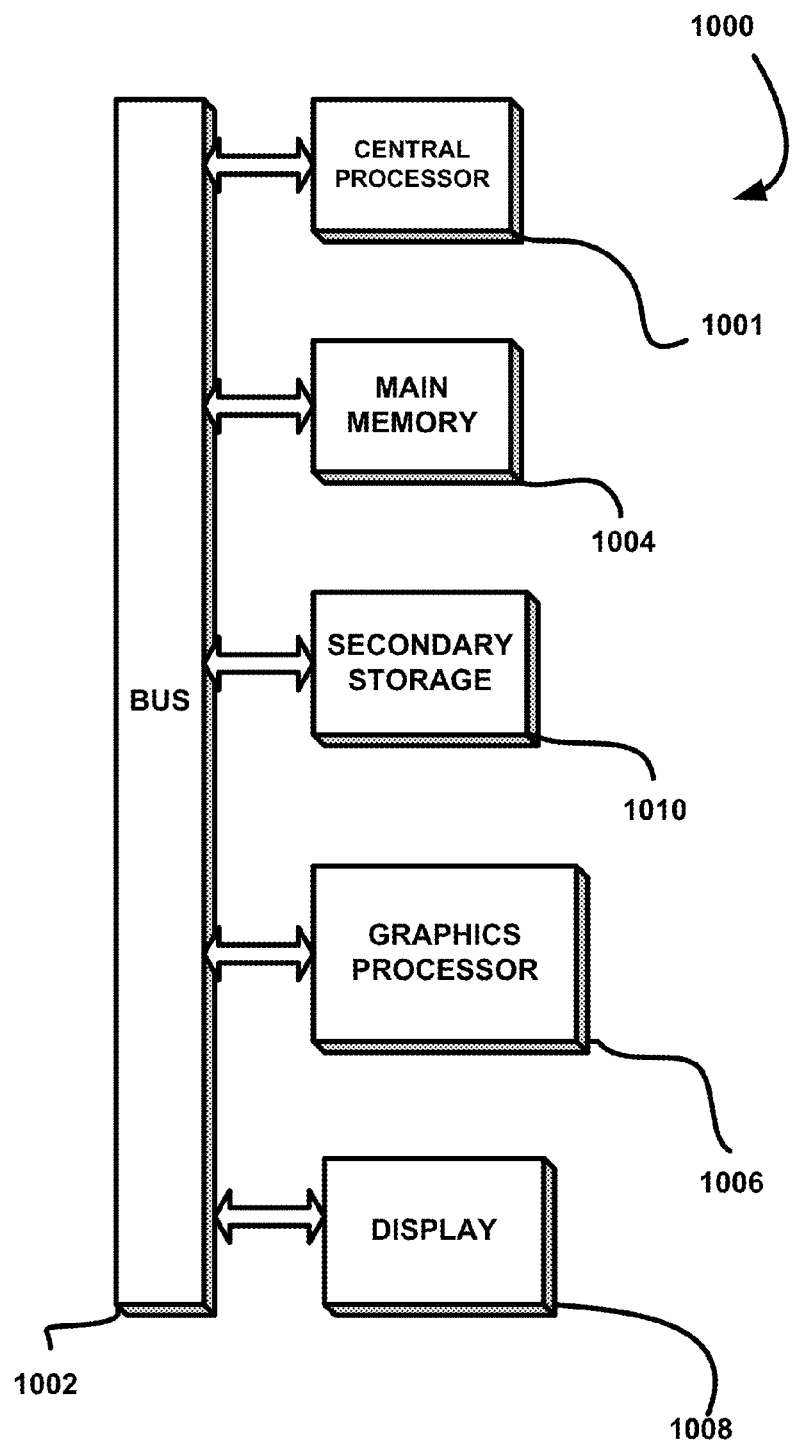
FIG. 10 illustrates an exemplary system, in accordance with one embodiment.

FIG. 10 illustrates an exemplary system 1000, in accordance with one embodiment. As an option, the system 1000 may be implemented in the context of any of the devices of the network architecture 900 of FIG. 9. Of course, the system 1000 may be implemented in any desired environment.

As shown, a system 1000 is provided including at least one central processor 1001 which is connected to a communication bus 1002. The system 1000 also includes main memory 1004 [e.g. random access memory (RAM), etc.]. The system 1000 also includes a graphics processor 1006 and a display 1008.

The system 1000 may also include a secondary storage 1010. The secondary storage 1010 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1004, the secondary storage 1010, and/or any other memory, for that matter. Such computer programs, when executed, enable the system 1000 to perform various functions (as set forth above, for example). Memory 1004, storage 1010 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product embodied on a non-transitory computer readable medium, comprising:

detecting, by a system, a change made to a particular portion of software, wherein prior to the change the software was determined to be stable;

determining, by the system from at least one repository, one or more functional testing entities mapped to the portion of software, each functional testing entity of the one or more functional testing entities providing functional scenario test coverage for the software;

determining, by the system from the at least one repository, one or more additional portions of the software mapped to the determined one or more functional testing entities, the one or more additional portions of the software being determined to be potentially impacted by the change made to the particular portion of the software by virtue of the one or more additional portions of the software and the particular portion of the software having a common mapping to the one or more functional testing entities;

determining, by the system, an impact score for each of the determined one or more functional testing entities, wherein the impact score indicates an impact of the functional testing entity on regression testing of the software and is based at least on a criticality predefined for the functional testing entity;

determining, by the system from the at least one repository, testing rules and test cases mapped to the determined one or more functional testing entities;

generating, by the system according to the impact scores for the determined one or more functional testing entities, a graph showing the determined one or more functional testing entities;

prioritizing, by the system, the one or more functional testing entities based on the graph; and performing, by the system according to the prioritization, regression testing on the one or more additional portions of the software determined to be mapped to the determined one or more functional testing entities, using the testing rules and test cases determined to be mapped to the determined one or more functional testing entities.

2. The computer program product of claim 1, wherein the impact score for each of the determined one or more functional testing entities is determined based on a size of a source code change associated with the functional testing entity.

3. The computer program product of claim 1, wherein the impact score for each of the determined one or more functional testing entities is determined based on a purpose of a source code change associated with the functional testing entity.

4. The computer program product of claim 1, wherein the impact score for each of the determined one or more functional testing entities is determined based on code metrics of source code associated with the functional testing entity.

5. The computer program product of claim 1, wherein the impact score for each of the determined one or more functional testing entities is determined based on a number of times a file of source code associated with the functional testing entity is changed.

6. The computer program product of claim 1, wherein the impact score for each of the determined one or more functional testing entities is determined based on a defect history of source code associated with the functional testing entity.

7. The computer program product of claim 1, wherein the impact score for each of the determined one or more functional testing entities is determined based on a knowledge level or experience of a programmer associated with a corresponding source code change.

8. The computer program product of claim 1, wherein the impact score for each of the determined one or more functional testing entities is determined based on configuration changes of non-source code related data associated with the functional testing entity.

9. The computer program product of claim 1, wherein the impact score for each of the determined one or more functional testing entities is determined based on criticality of business functionality associated with the functional testing entity.

10. A method, comprising:

detecting, by a system, a change made to a particular portion of software, wherein prior to the change the software was determined to be stable;

determining, by the system from at least one repository, one or more functional testing entities mapped to the portion of software, each functional testing entity of the one or more functional testing entities providing functional scenario test coverage for the software;

determining, by the system from the at least one repository, one or more additional portions of the software mapped to the determined one or more functional testing entities, the one or more additional portions of the software being determined to be potentially impacted by the change made to the particular portion of the software by virtue of the one or more additional portions of the software and the particular portion of the software having a common mapping to the one or more functional testing entities;

determining, by the system, an impact score for each of the determined one or more functional testing entities, wherein the impact score indicates an impact of the functional testing entity on regression testing of the software and is based at least on a criticality predefined for the functional testing entity;

determining, by the system from the at least one repository, testing rules and test cases mapped to the determined one or more functional testing entities;

generating, by the system according to the impact scores for the determined one or more functional testing entities, a graph showing the determined one or more functional testing entities;

prioritizing, by the system, the one or more functional testing entities based on the graph; and performing, by the system according to the prioritization, regression testing on the one or more additional portions of the software determined to be mapped to the determined one or more functional testing entities, using the testing rules and test cases determined to be mapped to the determined one or more functional testing entities.

11. A system comprising:

a memory system; and one or more processing cores coupled to the memory system and that are each configured to:

detect a change made to a particular portion of software, wherein prior to the change the software was determined to be stable;

determine, from at least one repository, one or more functional testing entities mapped to the portion of software, each functional testing entity of the one or more functional testing entities providing functional scenario test coverage for the software;

determine, from the at least one repository, one or more additional portions of the software mapped to the determined one or more functional testing entities, the one or more additional portions of the software being determined to be potentially impacted by the change made to the particular portion of the software by virtue of the one or more additional portions of the software and the particular portion of the software having a common mapping to the one or more functional testing entities;

determine an impact score for each of the determined one or more functional testing entities, wherein the impact score indicates an impact of the functional testing entity on regression testing of the software and is based at least on a criticality predefined for the functional testing entity;

determine, from the at least one repository, testing rules and test cases mapped to the determined one or more functional testing entities;

generate, according to the impact scores for the determined one or more functional testing entities, a graph showing the determined one or more functional testing entities;

prioritize the one or more functional testing entities based on the graph; and perform, according to the prioritization, regression testing on the one or more additional portions of the software determined to be mapped to the determined one or more functional testing entities, using the testing rules and test cases determined to be mapped to the determined one or more functional testing entities.

\* \* \* \* \*